US012606112B2

(12) United States Patent
Higa

(10) Patent No.: US 12,606,112 B2
(45) Date of Patent: Apr. 21, 2026

(54) CONTACT DETECTION APPARATUS

(71) Applicant: SUBARU CORPORATION, Tokyo (JP)

(72) Inventor: Shiaki Higa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 358 days.

(21) Appl. No.: 18/469,634

(22) Filed: Sep. 19, 2023

(65) Prior Publication Data

US 2024/0109505 A1 Apr. 4, 2024

(30) Foreign Application Priority Data

Oct. 4, 2022 (JP) ................................. 2022-160598

(51) Int. Cl.
B60R 19/18 (2006.01)
B60R 19/48 (2006.01)
(52) U.S. Cl.
CPC ............ B60R 19/483 (2013.01); B60R 19/18 (2013.01); B60R 2019/1873 (2013.01)
(58) Field of Classification Search
CPC ....... B60R 19/48; B60R 19/483; B60R 19/22; B60R 2019/1873; B60R 21/34; B60R 21/0136
See application file for complete search history.

(56) References Cited

U.S. PATENT DOCUMENTS

| | | | |
|---|---|---|---|
| 7,533,912 B2 * | 5/2009 | Frederick | B60R 19/18 293/142 |
| 9,809,187 B2 * | 11/2017 | Yamaguchi | B60R 19/18 |
| 2008/0122599 A1 * | 5/2008 | Suzuki | B60R 21/0136 340/436 |
| 2008/0203742 A1 * | 8/2008 | Takahashi | B60R 19/483 293/117 |

(Continued)

FOREIGN PATENT DOCUMENTS

| | | | | |
|---|---|---|---|---|
| JP | 2016016747 A | * | 2/2016 | ........... B60R 19/483 |
| JP | 2016-55711 A | | 4/2016 | |
| JP | 6447019 B2 | * | 1/2019 | |

OTHER PUBLICATIONS

JP 2015140040 with computer translation (Year: 2015).*
JP 2023130900 with computer translation (Year: 2023).*
JP 6418074 with computer translation (Year: 2018).*

*Primary Examiner* — Gregory A Blankenship
(74) *Attorney, Agent, or Firm* — Rimon P.C.

(57) ABSTRACT

A contact detection apparatus includes a bumper beam, an absorber, a contact sensor, a tube holder, a deformation space, and an absorber support member. The bumper beam extends in a vehicle width direction. The absorber is disposed adjacent to the bumper beam and extends in the vehicle width direction. The contact sensor includes a pressure tube and is configured to output a signal corresponding to a change in pressure of the pressure tube. The pressure tube extends in the vehicle width direction and is held by the absorber. The tube holder has a recess that holds the pressure (Continued)

tube. The deformation space is opened toward a rear side of a vehicle and configured to be deformed by a pressing force to be applied to the absorber. The absorber support member is provided in a gap between the absorber and a front panel of the vehicle.

5 Claims, 4 Drawing Sheets

(56)               References Cited

U.S. PATENT DOCUMENTS

| | | | |
|---|---|---|---|
| 2010/0038922 A1* | 2/2010 | Takahashi | B60R 19/483 |
| | | | 293/117 |
| 2014/0265445 A1* | 9/2014 | Leach | B60R 19/483 |
| | | | 296/187.04 |
| 2016/0039376 A1* | 2/2016 | Narita | B60R 19/18 |
| | | | 293/4 |
| 2016/0288750 A1* | 10/2016 | Nickel | B60R 19/483 |
| 2018/0265024 A1* | 9/2018 | Syvertsen | B60R 21/0136 |
| 2018/0272971 A1* | 9/2018 | Syvertsen | B60R 21/0136 |
| 2019/0023206 A1* | 1/2019 | Yoshida | B60R 21/0136 |
| 2021/0094495 A1* | 4/2021 | Park | B60R 21/0136 |
| 2023/0096952 A1* | 3/2023 | Yamamoto | G01L 1/02 |
| | | | 293/133 |
| 2024/0109505 A1* | 4/2024 | Higa | B60R 19/483 |

* cited by examiner

CONTACT DETECTION APPARATUS

CROSS-REFERENCE TO RELATED APPLICATIONS

The present application claims priority from Japanese Patent Application No. 2022-160598 filed on Oct. 4, 2022, the entire contents of which are hereby incorporated by reference.

BACKGROUND

The disclosure relates to a contact detection apparatus.

A vehicle is provided with a contact sensor on a rear side of a bumper cover of the vehicle. The contact sensor detects whether an object that has come into contact with the vehicle is a person. For example, Japanese Unexamined Patent Application Publication No. 2016-55711 discloses a vehicle contact sensor mounting structure that includes an impact absorbing member provided on a front side of a bumper beam. The impact absorbing member is formed in a substantially concave shape that is opened toward a rear side as a whole when viewed from a vehicle width direction. The impact absorbing member also includes a front part having a recess that holds a pressure tube. When the vehicle and the person come into contact with each other, the impact absorbing member is so deformed that the pressure tube is crushed in an up-down direction, thereby detecting the contact between the vehicle and the person. When the vehicle and an object other than the person such as a small animal come into contact with each other, an upper part and a lower part of the impact absorbing member are mainly deformed, whereby the deformation of the pressure tube is suppressed. This detects the contact between the object other than the person and the vehicle.

SUMMARY

An aspect of the disclosure provides a contact detection apparatus for a vehicle. The contact detection apparatus includes a bumper beam, an absorber, a contact sensor, a tube holder, a deformation space, and an absorber support member. The bumper beam extends in a width direction of the vehicle. The absorber is disposed adjacent to the bumper beam on a front side of the vehicle and extends in the width direction. The contact sensor includes a pressure tube and is configured to output a signal corresponding to a change in pressure of the pressure tube. The pressure tube extends in the width direction and is held by the absorber. The tube holder configures a portion of a rear end of the absorber and has a recess. The rear end is positioned on a rear side of the vehicle. The recess is opened toward the rear side of the vehicle and holds the pressure tube. The deformation space configures a portion of the rear end of the absorber and provided at an upper part of the tube holder. The deformation space is opened toward the rear side of the vehicle and configured to be deformed by a pressing force to be applied to the absorber. The absorber support member is provided in a gap between the absorber and a front panel of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
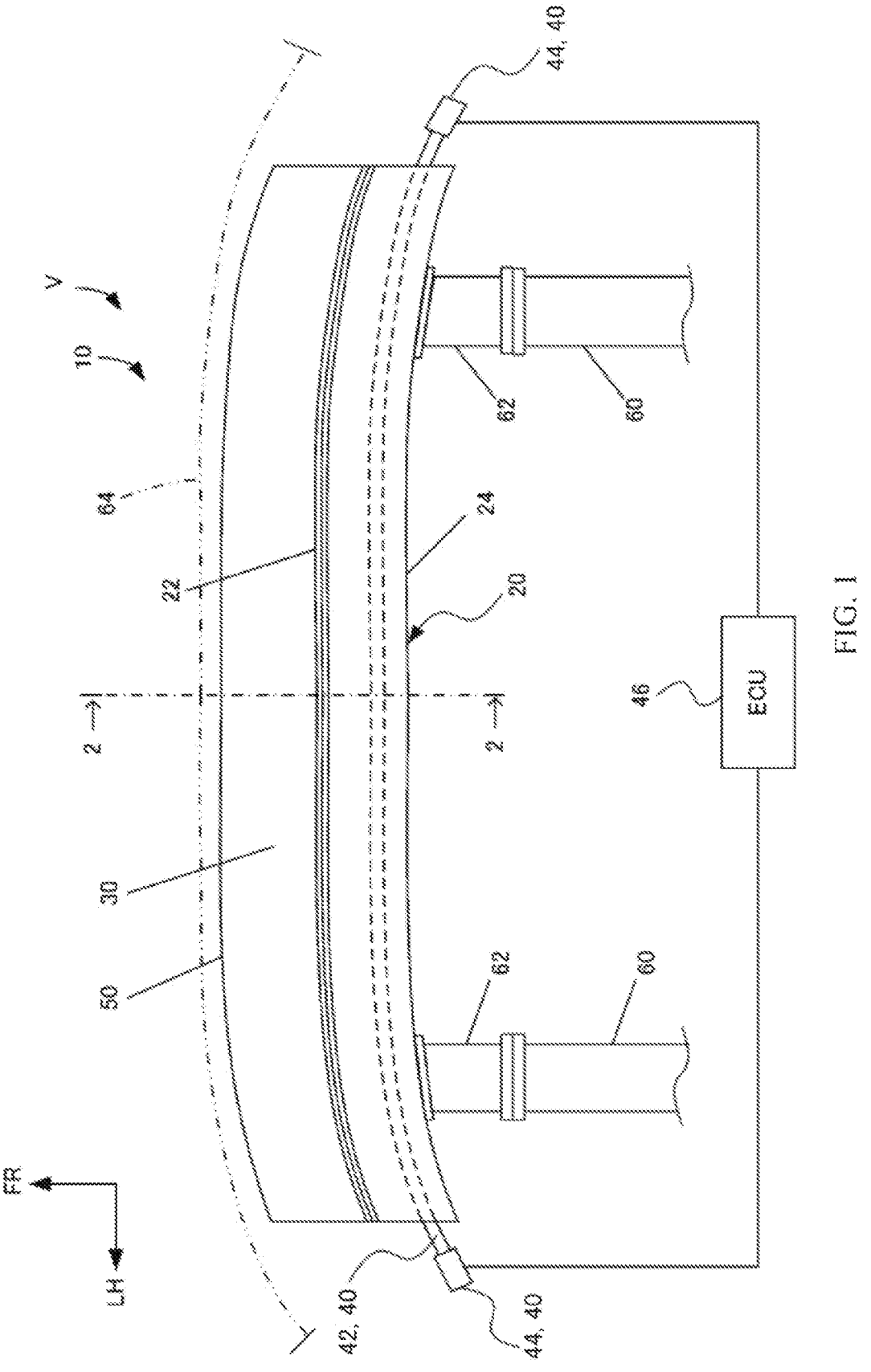
FIG. 1 is a schematic plan diagram illustrating a contact detection apparatus according to one example embodiment of the disclosure.

When a vehicle comes into contact with a person such as a pedestrian from the back of the pedestrian, the knees of the pedestrian are bent, and the pedestrian's upper body thereby falls down onto a front hood of the vehicle. Accordingly, an impact to be applied to the front hood by the upper body of the pedestrian falling onto the front hood is not so large, which can make it difficult for a contact detection apparatus to detect the contact of the pedestrian.

Further, a sensing sensitivity of a contact sensor may be increased to address an issue described above. However, increasing the sensing sensitivity of the contact sensor can lead to an occurrence of a malfunction upon contact between an object other than the person such as a small animal and the vehicle. This necessitates a review of a vehicle body structure in consideration of the present completeness of a sensing logic and a structure of a sensor body.

It is desirable to provide a contact detection apparatus that makes it possible to satisfactorily detect contact of an object with a vehicle, including a case where a person comes into contact with the vehicle from the back.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Hereinafter, a contact detection apparatus 10 according to an example embodiment will be described with reference to the drawings. It should be noted that an arrow FR denoted in any drawing indicates a front side of a vehicle V such as an automobile to which the contact detection apparatus 10 is applied. An arrow UP indicates an upper side of the vehicle V. An arrow LH indicates a left side of the vehicle V, or one side in a vehicle width direction of the vehicle V. In the following, an up-down direction, a front-rear direction, and a left-right direction respectively denote a vehicle up-down direction, a vehicle front-rear direction, and a vehicle left-right direction, when the description is made using the up-down direction, the front-rear direction, and the left-right direction unless otherwise specified.

Figure 2:
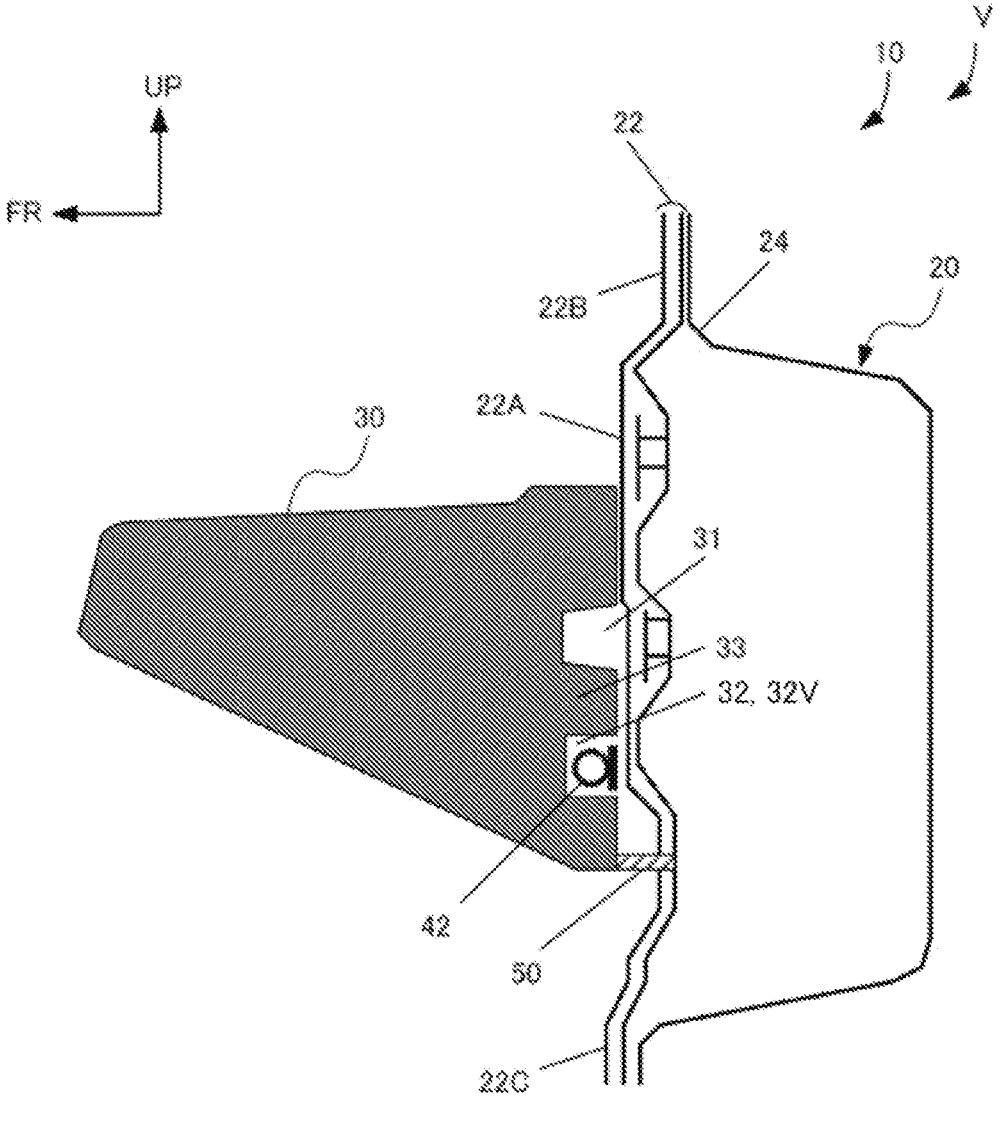
FIG. 2 is a cross-sectional diagram of the contact detection apparatus illustrated in FIG. 1 as viewed from a left side, or an enlarged cross-sectional diagram taken along line 2-2 in FIG. 1.

Referring to FIGS. 1 and 2, the contact detection apparatus 10 may be disposed at a front end of the vehicle V. The contact detection apparatus 10 may detect contact of an object with the vehicle V. The contact detection apparatus 10 includes a bumper beam 20 and an absorber 30. The bumper beam 20 may configure a skeleton member of the vehicle V. The absorber 30 may be disposed on a front side of the bumper beam 20. The contact detection apparatus 10 includes a contact sensor 40. Hereinafter, each configuration of the contact detection apparatus 10 will be described.

[Bumper Beam 20]

The bumper beam 20 extends in the left-right direction. In one embodiment, the left-right direction may serve as a "vehicle width direction". The bumper beam may be formed in a substantially rectangular closed cross-sectional shape in a cross-sectional view as viewed in a longitudinal direction of the bumper beam 20. The bumper beam 20 may include a front panel 22 and a rear panel 24. The front panel 22 may configure a front end of the bumper beam 20. The rear panel 24 may configure a rear part of the bumper beam 20.

The front panel 22 may include a metal plate material. The front panel 22 may extend in the front-rear direction as a plate thickness direction and in the left-right direction. The front panel 22 may have, at an intermediate part in the up-down direction of the front panel 22, a protrusion 22A protruding toward the front side. The front panel 22 may include an upper flange 22B at an upper side of the protrusion 22A. The front panel 22 may include a lower flange 22C at a lower side of the protrusion 22A.

As with the front panel 22, the rear panel 24 may include a metal plate and extend in the left-right direction. The rear panel 24 may be formed in a substantially hat shape opened toward the front side when viewed in a longitudinal direction of the rear panel 24. The rear panel 24 may include an upper end joined to the upper flange 22B of the front panel 22. The rear panel 24 may include a lower end joined to the lower flange 22C of the front panel 22.

A pair of right and left front side frames 60 configuring the skeleton of the vehicle V may be provided on a rear side of the bumper beam 20. The front side frames 60 may extend in the front-rear direction. The bumper beam 20 may include both ends in the vehicle width direction that are coupled to respective front ends of the front side frames 60 via crash boxes 62.

[Absorber 30]

The absorber 30 may include a foamed resin material such as urethane foam. The absorber 30 may be formed in a substantially elongated shape in which a longitudinal direction of the absorber 30 is in the left-right direction. The absorber 30 may be disposed adjacent to a front side of the protrusion 22A of the bumper beam 20. The absorber 30 may be formed in a substantially trapezoidal shape in a cross-sectional view as viewed in the longitudinal direction. The absorber 30 may have a lower surface inclined downward toward a rear side as viewed in the left-right direction.

As illustrated in FIG. 2 as well, the absorber 30 may include, on a lower side of a rear end of the absorber 30, a tube holder 32 that holds a pressure tube 42. The tube holder 32 has a recess 32V. The tube holder 32 may have a substantially rectangular shape in which the rear side is opened to form the recess 32V. The pressure tube 42 is disposed at the middle of the tube holder 32. The tube holder 32 may include an upper part having a deformation space 31. The deformation space 31 is configured to be deformed by a pressing force to be applied to the absorber 30. The deformation space 31 may have a substantially rectangular shape in which the rear side is opened. An abutting part 33 that is to be abut against the front panel 22 may be provided between the tube holder 32 and the deformation space 31. An absorber support member 50 may be provided at a lower end of the rear end of the absorber 30 in a gap between the absorber 30 and the front panel 22. The absorber support member 50 may have a rod shape, and may support the lower end of the rear end of the absorber 30. As illustrated in FIG. 1, a bumper cover 64 may be provided on a front side of the absorber 30. The bumper cover 64 may configure the front end of the vehicle V and cover the front side of the absorber 30.

[Contact Sensor 40]

The contact sensor 40 includes the pressure tube 42 held by the absorber 30. The contact sensor may also include a pressure sensor 44 that outputs a signal corresponding to a change in pressure of the pressure tube 42. In one embodiment, the pressure sensor 44 may serve as a "pressure detector".

The pressure tube 42 may be formed in an elongated shape in which a longitudinal direction of the pressure tube 42 is the left-right direction. The pressure tube 42 may be a hollow structure having a substantially annular cross section. The pressure tube 42 is disposed in the tube holder 32.

The pressure sensor 44 may be provided at both ends in the longitudinal direction of the pressure tube 42. The pressure sensors 44 may be fixed to a body of the vehicle V at unillustrated respective predetermined positions. The pressure sensor 44 may be electrically coupled to an ECU 46. In one embodiment, the ECU 46 may serve as a "contact determiner". When the pressure tube 42 is deformed, the signal corresponding to the change in the pressure in the pressure tube 42 may be outputted from the pressure sensor 44 to the ECU 46.

The ECU 46 may calculate a value of the pressure change in the pressure tube 42, based on the signal outputted from the pressure sensor 44. Further, the ECU 46 may determine whether the value of the pressure change exceeds a threshold, and determine whether an object that has come into contact with the bumper cover 64 is a person or an object other than the person, such as a small animal. In some embodiments, the ECU 46 may determine that the object is the person when the value of the pressure change in the pressure tube 42 is equal to or greater than the threshold, and determine that the object is other than the person when the value of the pressure change in the pressure tube 42 is less than the threshold.

[Workings and Example Effects]

Next, workings and example effects of the example embodiment will be described while describing an operation of the contact detection apparatus 10 upon a front contact where the vehicle V comes into contact with the back of a person and upon a front contact where the vehicle V comes into contact with an object other than the person.

Figure 3:
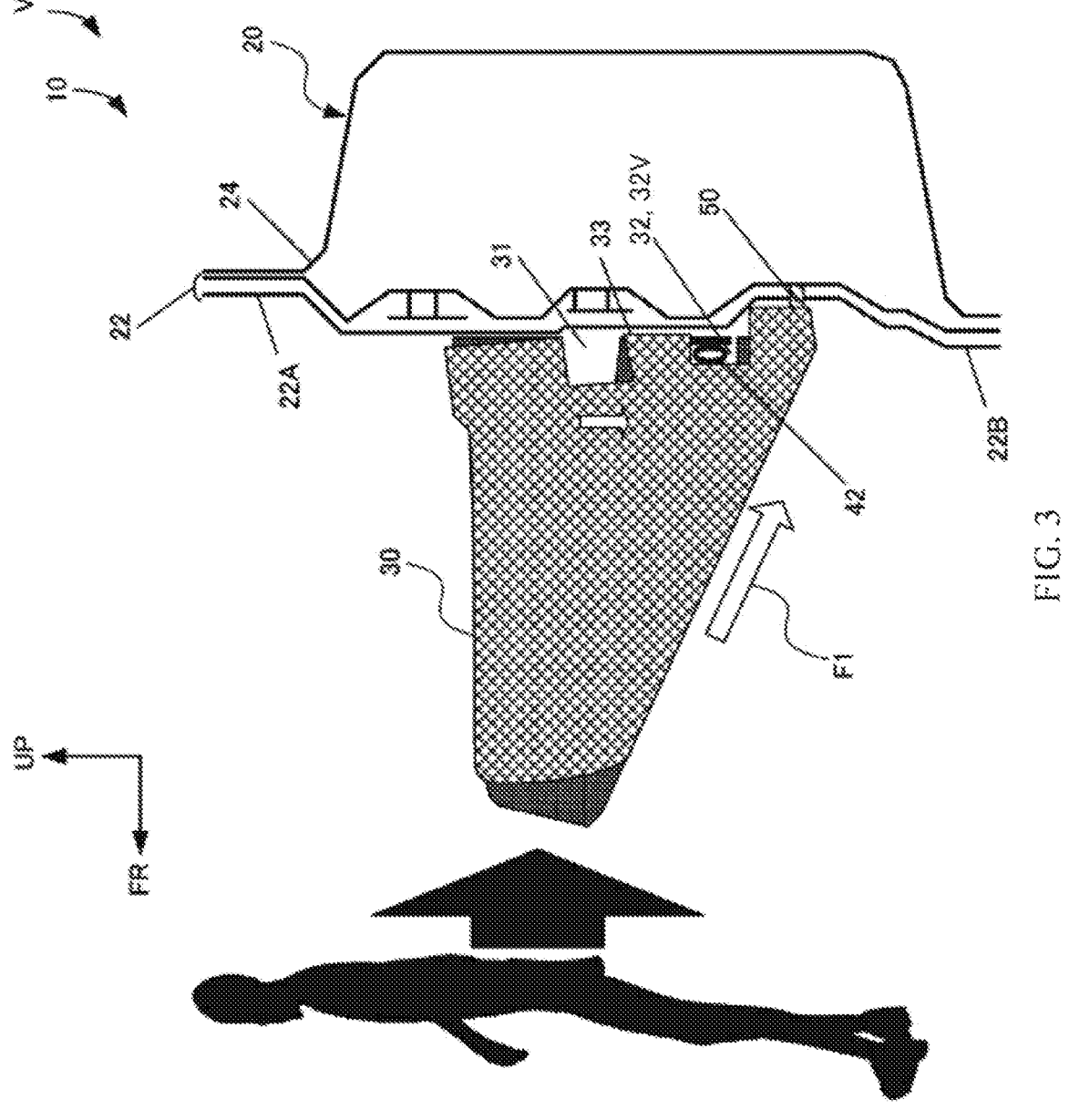
FIG. 3 is a cross-sectional diagram of the contact detection apparatus illustrated in FIG. 1 as viewed from the left side, or an enlarged cross-sectional diagram taken along line 2-2 in FIG. 1, when a person comes into contact with a vehicle from the back.

Upon the front contact where the vehicle V comes into contact with the person from the back of the person, the legs of the person hit the bumper cover 64, and the knees of the person are bent, causing the upper body of the person to fall onto the front hood of the vehicle V. Accordingly, as illustrated in FIG. 3, a contact load F1 directed obliquely downward toward the rear is mainly applied to the bumper cover 64 and to an upper part of the absorber 30. When the contact load F1 is applied to the upper part of the absorber 30, an inclined surface serving as the lower surface of the absorber 30 is pushed downward obliquely toward the rear, and the support member 50 of the absorber 30 goes inside the lower end of the rear end of the absorber 30. As a result of the support member 50 of the absorber 30 going inside the lower end of the rear end of the absorber 30, the absorber 30 as a whole projects obliquely downward toward the front. Thus, the deformation space 31 is deformed downward, causing the tube holder 32 to be deformed under a downward force and a forward force resulting from the deformation of the deformation space 31, which in turn causes an upper surface and a surface on the vehicle front side of the tube holder 32 to press the pressure tube 42. Accordingly, the pressure tube 42 is so deformed as to be crushed. Thus, the pressure in the pressure tube 42 changes, and the pressure sensor 44 outputs, to the ECU 46, the signal corresponding to the pressure change of the pressure tube 42. Consequently, the ECU 46 detects that the object is the person. In some embodiments where the abutting part 33 that is to be abut against the front panel 22 is provided between the tube holder 32 and the deformation space 31, the abutting part 33 may serve as a fulcrum for the deformation of the absorber 30 in response to the contact load F1 directed obliquely downward toward the rear.

Figure 4:
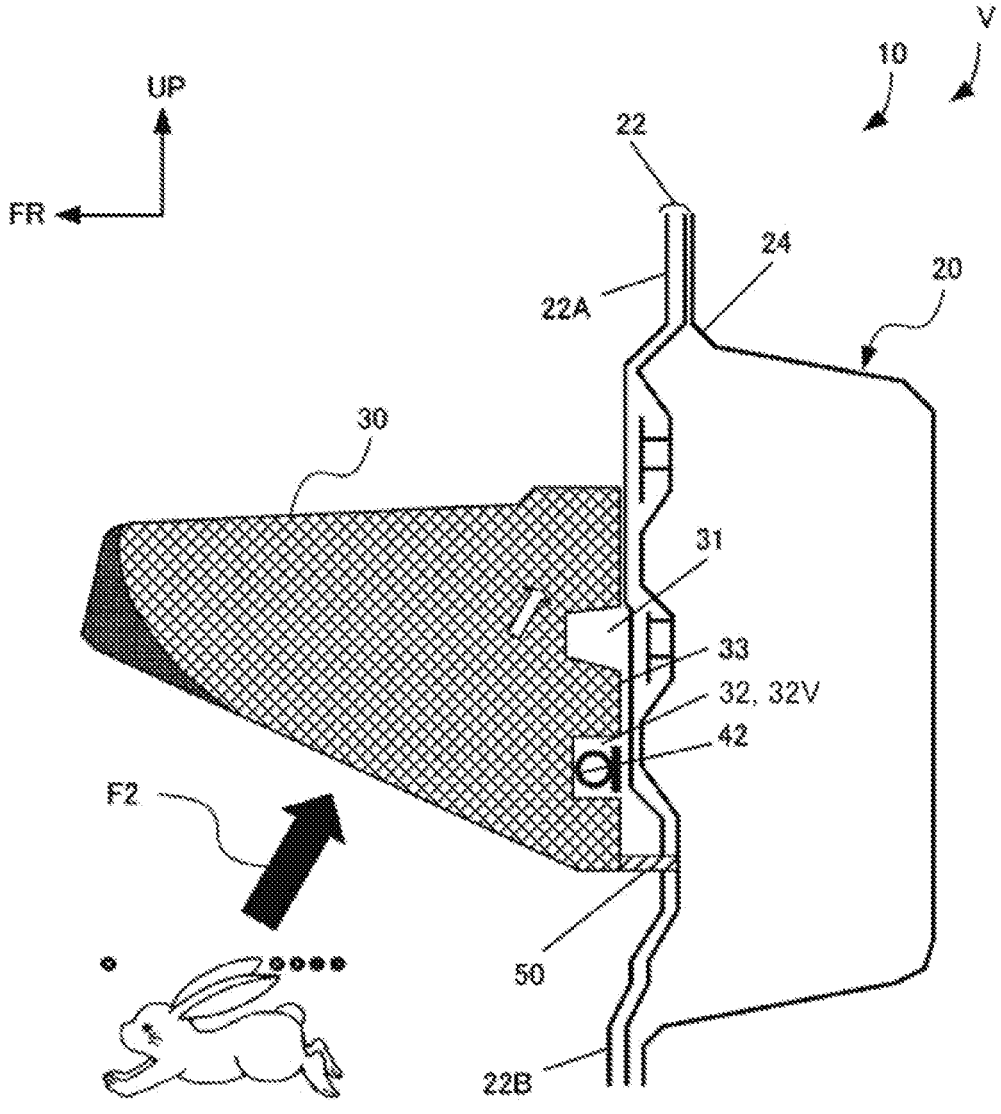
FIG. 4 is a cross-sectional diagram of the contact detection apparatus illustrated in FIG. 1 as viewed from the left side, or an enlarged cross-sectional diagram taken along line 2-2 in FIG. 1, when an object other than the person such as a small animal comes into contact with the vehicle.

Upon the front contact where the vehicle V comes into contact with an object other than the person such as a small animal, the object hits a lower part of the bumper cover 64. Accordingly, as illustrated in FIG. 4, a contact load F2 directed obliquely upward toward the rear is mainly applied to the bumper cover 64 and to the lower surface of the absorber 30. When the contact load F2 is applied to the lower surface of the absorber 30, a large force is hardly propagated to the support member 50 of the absorber 30, preventing the support member 50 from going inside the lower end of the rear end of the absorber 30, and allowing the current state to be substantially maintained. As a result, a force that causes a large deformation hardly acts on the deformation space 31 and the tube holder 32 as well, suppressing the abutment of the surface configuring the tube holder 32 to the pressure tube 42. Thus, the change in the pressure in the pressure tube 42 upon the contact of the vehicle V with the object other than the person is small. Consequently, the ECU 46 detects that the object that has come into contact with the bumper cover 64 is, for example, a small animal other than the person. In some embodiments where the abutting part 33 that is to be abut against the front panel 22 is provided between the tube holder 32 and the deformation space 31, the area where a rear surface of the absorber 30 and the front panel 22 abut against each other increases.

The contact detection apparatus 10 according to the example embodiment includes: the bumper beam 20 extending in the vehicle width direction; the absorber 30 disposed adjacent to the bumper beam 20 on the front side of the vehicle and extending in the vehicle width direction; the contact sensor 40 including the pressure tube 42 and configured to output the signal corresponding to the change in pressure of the pressure tube 42, in which the pressure tube extends in the vehicle width direction and is held by the absorber 30; the tube holder 32 configuring a portion of the rear end of the absorber 30 and having a recess, in which the recess is opened toward the rear side of the vehicle V and holds the pressure tube 42; the deformation space 31 configuring a portion of the rear end of the absorber 30 and provided at the upper part of the tube holder 32, in which deformation space 31 is opened toward the rear side of the vehicle V and configured to be deformed by the pressing force to be applied to the absorber 30; and the absorber support member 50 provided in the gap between the absorber 30 and the front panel 22.

With this configuration, upon the front contact where the vehicle V comes into contact with the person from the back of the person, the legs of the person hit the bumper cover 64, and the knees of the person are bent, causing the upper body of the person to fall onto the front hood of the vehicle V. Accordingly, the contact load F1 directed obliquely downward toward the rear is mainly applied to the bumper cover 64 and to the upper part of the absorber 30. The contact load F1 propagates, and the inclined surface of the lower surface of the absorber 30 is pushed downward obliquely to the rear, causing the absorber support member 50 to go inside the lower end of the rear end of the absorber 30. As a result of the support member 50 of the absorber 30 going inside the lower end of the rear end of the absorber 30, the absorber 30 as a whole projects obliquely downward toward the front. Thus, the deformation space 31 is deformed downward, causing the tube holder 32 to be deformed under the downward force and the forward force resulting from the deformation of the deformation space 31, which in turn causes the upper surface and the surface on the vehicle front side of the tube holder 32 to press the pressure tube 42. Accordingly, the pressure tube 42 is so deformed as to be crushed. Thus, the pressure in the pressure tube 42 changes, and the pressure sensor 44 outputs, to the ECU 46, the signal corresponding to the pressure change of the pressure tube 42. Consequently, it is possible for the ECU 46 to detect that the object is the person. Upon the front contact where the vehicle V comes into contact with the person from the back of the person, the contact load F1 is smaller than upon the front contact where the vehicle V comes into contact with the person other than from the back. However, even in such a case, this configuration helps to appropriately detect that the object that has come into contact with the vehicle V is a person.

Upon the front contact where the vehicle V comes into contact with the object other than the person such as a small animal, the contact load F2 directed obliquely upward toward the rear is mainly applied to the bumper cover 64 and to the lower surface of the absorber 30. However, even when the contact load F2 is applied to the lower surface of the absorber 30, the large force is hardly propagated to the absorber support member 50, preventing the absorber support member 50 from going inside the lower end of the rear end of the absorber 30, and allowing the current state to be substantially maintained. As a result, the force that causes the large deformation hardly acts on the deformation space 31 and the tube holder 32 as well, suppressing the abutment of the surface configuring the tube holder 32 to the pressure tube 42. Thus, the change in the pressure in the pressure tube 42 upon the contact of the vehicle V with the object other than the person is small. Consequently, it is possible for the ECU 46 to detect that the object that has come into contact with the bumper cover 64 is, for example, a small animal other than the person. Even upon the front contact where the vehicle V comes into contact with the object other than the person such as a small animal, this configuration helps to prevent an inappropriate operation of, for example, a safety device due to an erroneous detection.

In some embodiments, the abutting part 33 configured to abut against the front panel 22 may be provided between the tube holder 32 and the deformation space 31. The abutting part 33 may serve as the fulcrum for the deformation of the absorber 30 in response to the contact load F1 directed obliquely downward toward the rear upon the front contact where the vehicle V comes into contact with the person from the back of the person. Accordingly, providing the abutting part 33 helps to appropriately promote the deformation of the absorber 30 when the vehicle V comes into contact with the person from the back of the person even where the contact load F1 is small, compared with when the vehicle V comes into contact with the person other than from the back. Upon the front contact where the vehicle V comes into contact with an object other than the person such as a small animal, this configuration increases the area where the rear surface of the absorber 30 and the front panel 22 abut against each other, which helps to suppress an excessive deformation of the absorber 30.

In some embodiments, the degree of deformation of the tube holder 32 and the deformation space 31 may be adjusted by changing a factor such as a position or a width of the abutting part 33. This configuration helps to achieve effects similar to those described above even when a size and a shape of the absorber 30 are changed depending on the specifications.

According to at least one embodiment of the disclosure, it is possible to satisfactorily detect contact of an object with a vehicle, including a case where a person comes into contact with the vehicle from the back.

As used herein, the term "collision" may be used interchangeably with the term "contact".

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The invention claimed is:

1. A contact detection apparatus for a vehicle, the contact detection apparatus comprising:
    a bumper beam extending in a width direction of the vehicle;
    an absorber disposed adjacent to the bumper beam on a front side of the vehicle and extending in the width direction;
    a contact sensor including a pressure tube and configured to output a signal corresponding to a change in pressure in the pressure tube, the pressure tube extending in the width direction and being held by the absorber;
    a tube holder configuring a portion of a rear end of the absorber, and having a recess, the rear end being positioned on a rear side of the vehicle, the recess being opened toward the rear side of the vehicle and holding the pressure tube;
    a deformation space configuring a portion of the rear end of the absorber and provided at an upper part of the tube holder, the deformation space being opened toward the rear side of the vehicle and configured to be deformed by a pressing force to be applied to the absorber; and
    an absorber support member provided in a gap between the absorber and a front panel of the vehicle, the absorber support member being located below the tube holder in a vehicle up-down direction and supporting a lower end of the rear end of the absorber.

2. The contact detection apparatus according to claim 1, further comprising an abutting part provided between the tube holder and the deformation space and configured to abut against the front panel.

3. The contact detection apparatus according to claim 1, wherein the deformation space, the tube holder, and the absorber support member are arranged in that order toward a bottom of the vehicle.

4. The contact detection apparatus according to claim 1, wherein the absorber support member is provided at a lower rear end of the absorber, and the absorber support member supports the lower rear end of the absorber.

5. The contact detection apparatus according to claim 4, wherein, when a contact load directed obliquely downward toward the rear is applied to an upper part of the absorber, the support member of the absorber goes inside the lower end of the rear end of the absorber.

* * * * *